United States Patent
Vossmann

(10) Patent No.: US 6,332,649 B1
(45) Date of Patent: Dec. 25, 2001

(54) LOCKING MECHANISM FOR AN AUTOMOBILE SEAT

(75) Inventor: Gregor Vossmann, Vreden (DE)

(73) Assignee: Keiper GmbH & Co., Kaiserlautern (DE)

(*) Notice: Subject to any disclaimer, the term of this patent is extended or adjusted under 35 U.S.C. 154(b) by 0 days.

(21) Appl. No.: 09/461,439

(22) Filed: Dec. 14, 1999

(30) Foreign Application Priority Data

Jan. 28, 1999 (DE) .............................. 199 04 299

(51) Int. Cl.⁷ ...................................................... B60N 2/20
(52) U.S. Cl. ............................................. 297/366; 297/367
(58) Field of Search ...................................... 297/366, 367

(56) References Cited

U.S. PATENT DOCUMENTS

| | | | |
|---|---|---|---|
| 5,622,407 | 4/1997 | Yamada et al. | 297/366 |
| 5,681,086 | * 10/1997 | Baloche | 297/367 |
| 5,749,624 | * 5/1998 | Yoshida | 297/367 |
| 5,755,491 | * 5/1998 | Baloche et al. | 297/367 X |
| 5,816,656 | * 10/1998 | Hoshihara et al. | 297/367 |
| 5,857,746 | * 1/1999 | Barrere et al. | 297/367 |
| 6,007,153 | * 12/1999 | Benoit et al. | 297/367 X |
| 6,024,410 | * 2/2000 | Yoshida | 297/367 X |
| 6,039,400 | * 3/2000 | Yoshida et al. | 297/367 |
| 6,085,386 | * 6/2000 | Blanchard et al. | 297/367 X |
| 6,102,480 | * 8/2000 | Asano | 297/367 X |
| 6,112,370 | * 9/2000 | Blanchard et al. | 297/367 X |
| 6,164,723 | * 12/2000 | Ganot | 297/367 X |

FOREIGN PATENT DOCUMENTS

| | | |
|---|---|---|
| 44 41 159 A1 | 5/1995 | (DE) . |
| 44 19 411 A1 | 12/1995 | (DE) . |
| 197 37 637 A1 | 3/1998 | (DE) . |
| 198 14 225 A1 | 10/1998 | (DE) . |
| 0 694 434 A1 | 1/1996 | (EP) . |
| 0 720 930 A1 | 7/1996 | (EP) . |
| 0 770 514 A1 | 5/1997 | (EP) . |
| 0 978 413 A1 | 2/2000 | (EP) . |
| 2 771 687 A1 | 6/1999 | (FR) . |
| 2 078 294 A | 1/1982 | (GB) . |

* cited by examiner

*Primary Examiner*—Jose V. Chen
*Assistant Examiner*—Rodney B. White
(74) *Attorney, Agent, or Firm*—Alston & Bird LLP

(57) ABSTRACT

A locking mechanism has a lower member secured to a seat base, and an upper member that can rotate relative to the lower member and is secured to a seat back. A control element is capable of being rotated with a bar. A spring biases the control element toward a first configuration in which the control element drives a locking element radially away from the bar so that the locking element restricts rotation of the upper member relative to the lower member. The bar is capable of being rotated to a second configuration, and the control element rotates with the bar so that the locking element is capable of traveling radially toward the bar during the second configuration. A drive mechanism rotates with the bar and drives the locking element radially toward the bar during the second configuration, so that rotation of the upper member relative to the lower member is allowed. A transmission element is positioned between the control element and the bar. The transmission element has a first flange proximate the outer side of the upper member and a second flange proximate the outer side of the lower member, and the flanges restrict movement of the upper and lower members away from one another so that the transmission element functions as an axial safety device.

23 Claims, 4 Drawing Sheets

LOCKING MECHANISM FOR AN AUTOMOBILE SEAT

FIELD OF THE INVENTION

The invention relates to a locking mechanism for a vehicle seat, in particular for an automobile seat.

In a known locking mechanism of this kind, an upper member of the mechanism is supported on a bearing element, which is again supported in a lower member of the mechanism. The bearing element, which is arranged in the space between the upper member and the lower member of the mechanism and constructed as a complicated combination of collars, is used at the same time as a control cam element for moving two locking elements of the mechanism. These two locking elements are pushed radially outward, while being guided in a guideway, for engaging the locking element mechanism. The combined bearing and control cam element is mounted directly on a bar. After installing the locking mechanism in an automobile seat, this bar extends to the mechanism on the other side and to an adjustment device. By rotating the bar, the bearing and control cam element rotates, thereby moving the locking elements.

SUMMARY OF THE INVENTION

It is the object of the invention to improve a locking mechanism of the initially described kind. According to the invention, this object is accomplished by a locking mechanism having a lower member that is capable of being secured to a seat base and an upper member that is capable of being rotated relative to the lower member and is further capable of being secured to a seat back. A control element that is capable of being rotated with a bar drives a locking element radially away from the bar so that the locking element restricts rotation of the upper member relative to the lower member. A transmission element is positioned between the control element and the bar.

As a result of providing a transmission element between the control element and the bar, it is no longer necessary to use a control element of such a complicated construction, which simplifies the production of the locking mechanism and reduces its costs. Preferably, the transmission element is designed and constructed at the same time as an axial safety device for holding together the upper and lower members of the locking mechanism, namely primarily as a safety device for assembly and transportation. A transmission of great loads in axial direction is not needed, since it is common to provide therefor separate sheet metal holders. Flange sections on the axial safety device that lie against the oppositely directed outer sides of the upper member and the lower member of the mechanism, have the advantage that they have a sealing effect and prevent varnish from entering the interior of the locking mechanism in the case of dip varnishing.

For a simpler manufacture and assembly, it will be of advantage, when the transmission element consists of two identical halves. Preferably, the two halves are joined in the interior of the locking mechanism, namely in the region between the upper member and lower member thereof, so that the transmission element is insensitive to a dropping of the assembled mechanism.

For holding the two halves of the transmission element safely together, same comprise at least two projections and at least two recesses, preferably three each of such elements, with the projections and recesses being arranged alternatingly in the circumferential direction, and the projections of the one half engaging the recesses of the other half. The projections and recesses of the two halves of the transmission element form preferably a clip connection, when the two halves are joined, so that no additional connection parts are needed. The cohesion will be improved, when the projections and recesses are toothed.

Since the transmission element must transmit only small forces in axial direction, it may consist of plastic, which brings the advantage of a simple and costfavorable manufacture.

The automobile seat of the present invention comprises at least one, preferably two of the locking mechanisms according to the invention, which are interconnected by means of a bar.

BRIEF DESCRIPTION OF THE DRAWINGS

In the following, the invention is described in greater detail with reference to an embodiment illustrated in the drawing, in which.

DETAILED DESCRIPTION OF THE INVENTION

Figure 1:
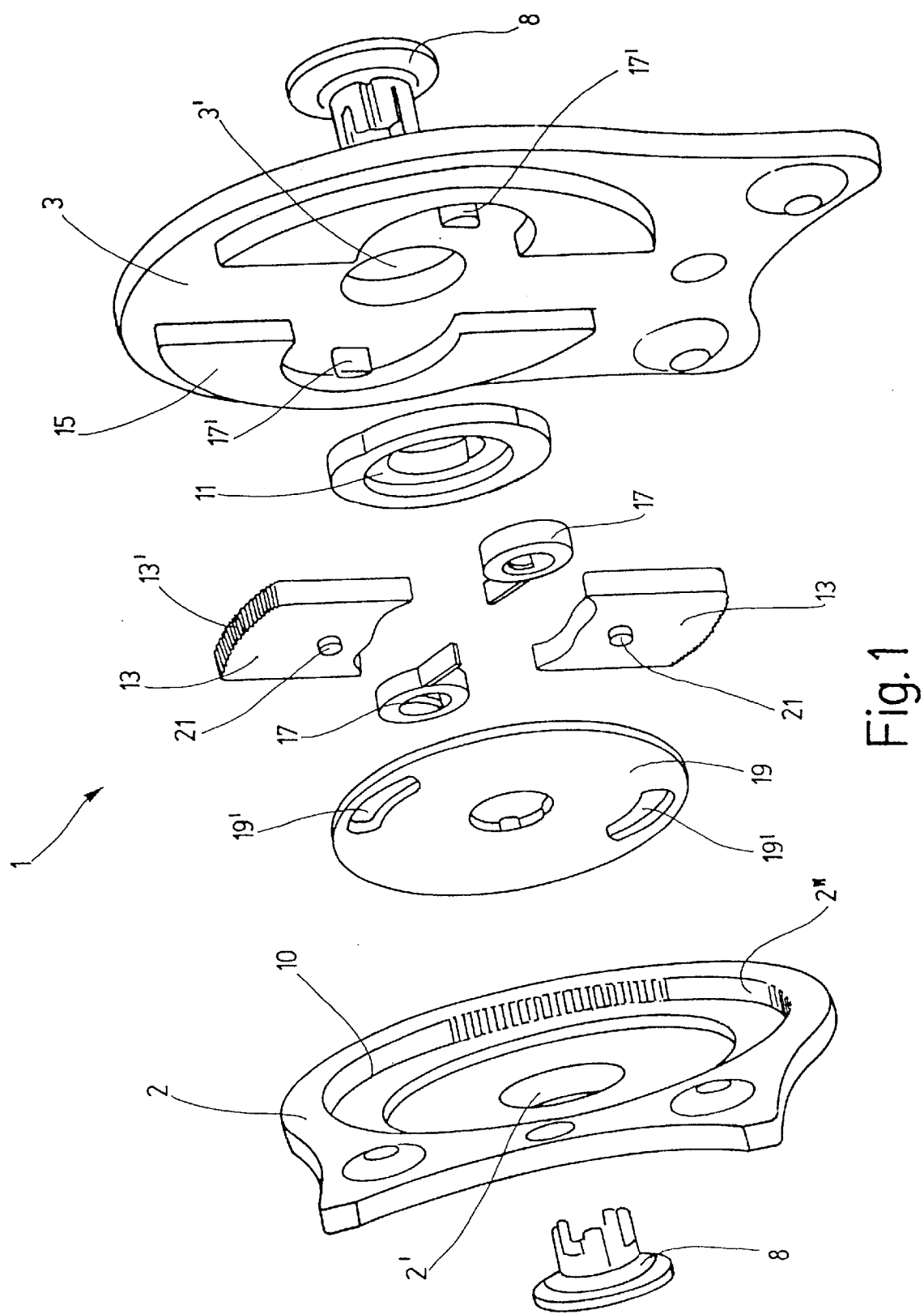
FIG. 1 illustrates perspective views of the individual structural parts of the embodiment, wherein the two structural parts on the left are shown from a different perspective than the other structural parts.
Figure 2:
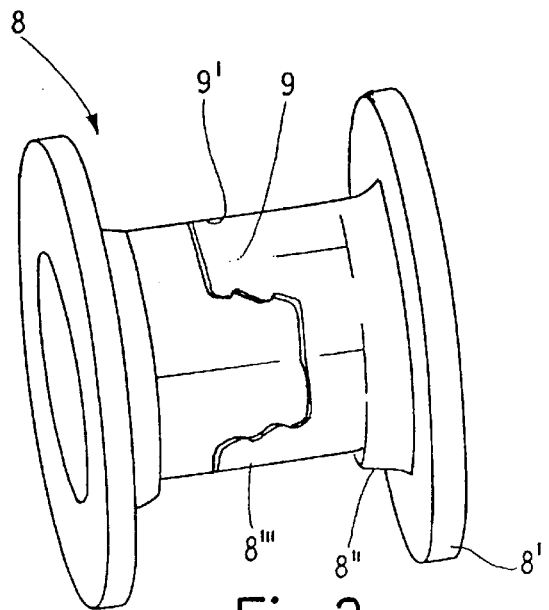
FIG. 2 is a perspective view of an axial safety device.
Figure 3:
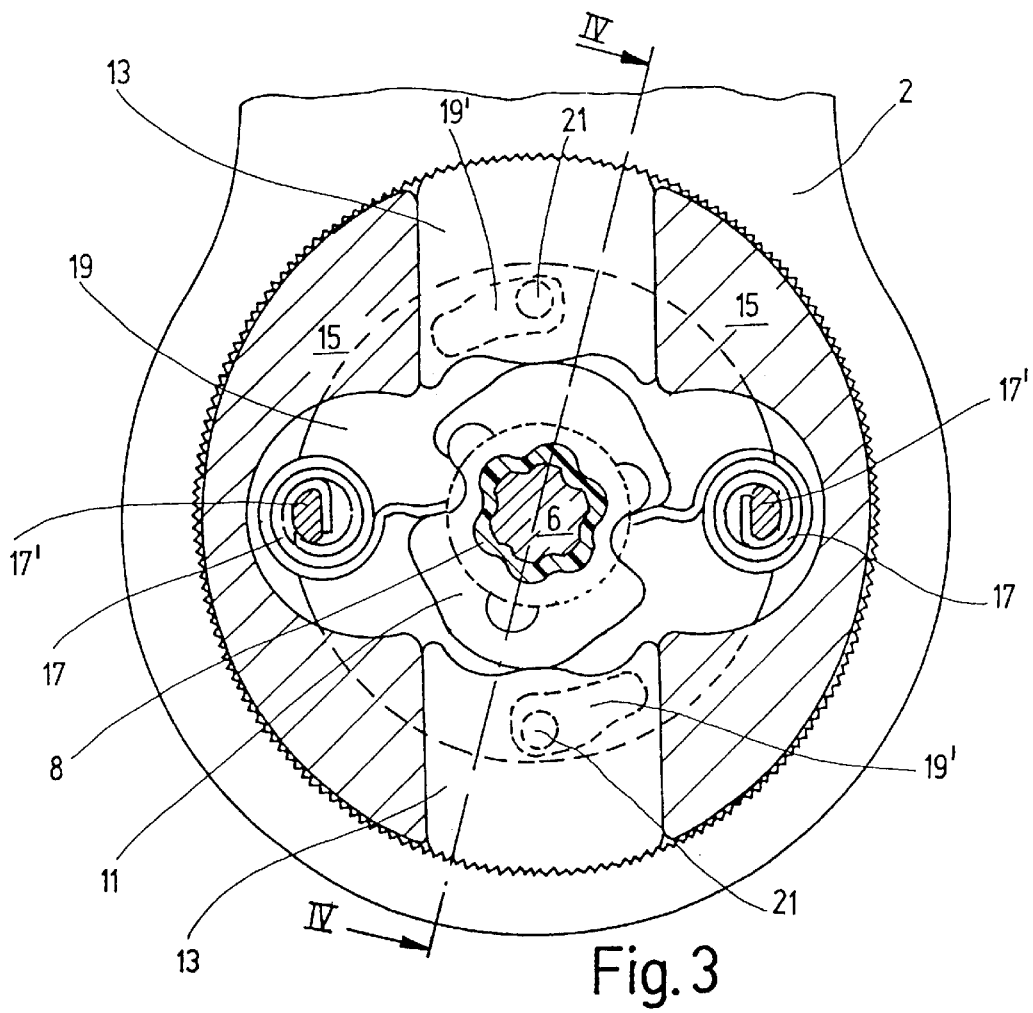
FIG. 3 is a radially sectioned view of the embodiment along line III—III of FIG. 4.
Figure 4:
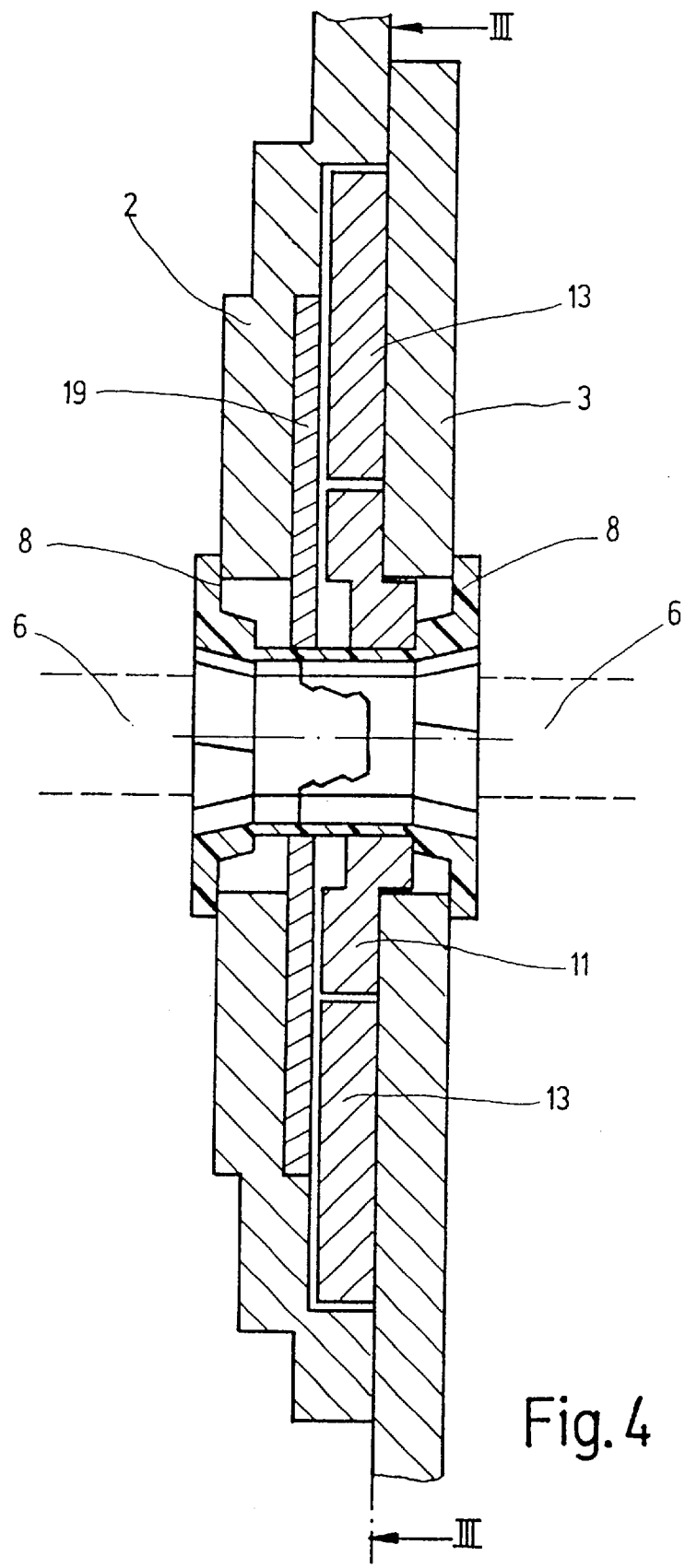
FIG. 4 is an axially sectioned view of the embodiment along line IV—IV of FIG. 3.
Figure 5:
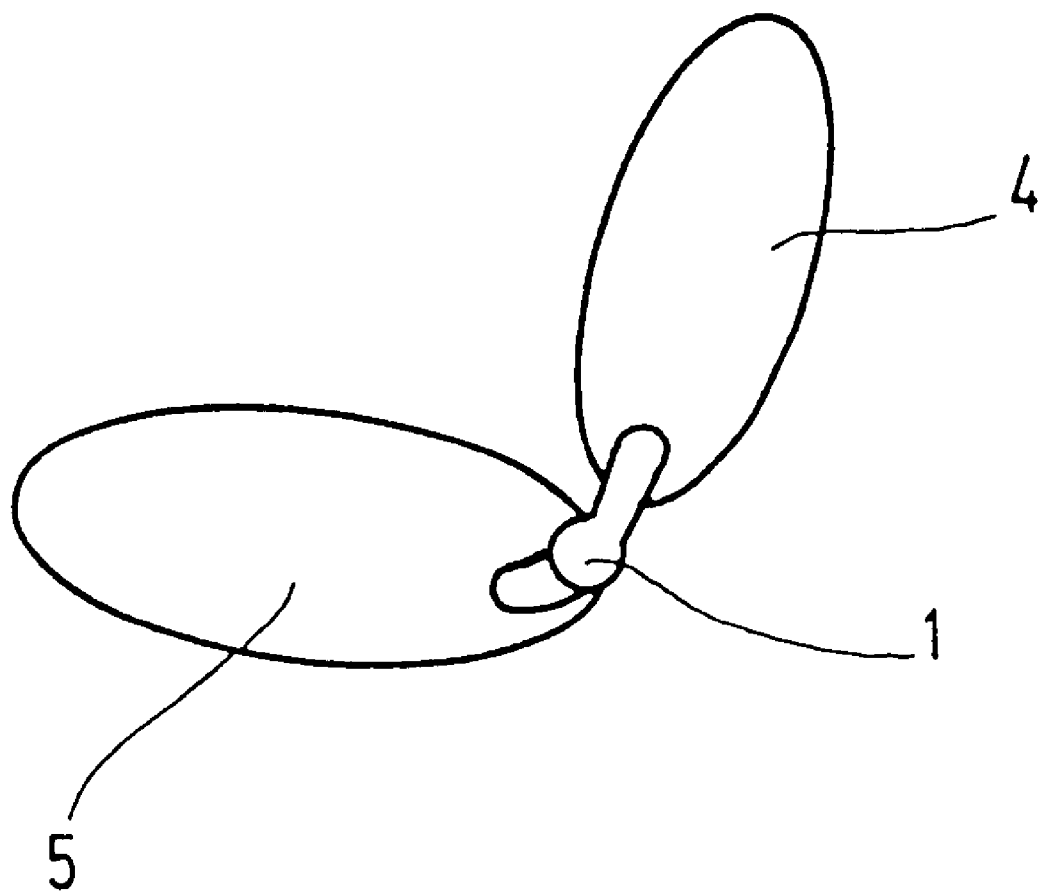
FIG. 5 is a schematic partial view of an automobile seat of the present invention.

A locking mechanism of an automobile seat, generally indicated at 1, comprises an upper member 2 and a lower member 3. One locking mechanism is arranged on each side of the automobile seat. A seat back 4 secured to the upper member 2 is connected with the seat structure 5 of the automobile seat by the two locking mechanisms 1. The two locking mechanisms 1 are interconnected by a bar 6, which is illustrated by broken lines in FIG. 4.

The upper member 2 and lower member 3 are each provided in the center of a disk-shaped section with a bore 2' and 3' respectively, which form a passageway for the bar 6. From the outside of upper member 2 and lower member 3 respectively, namely from each side facing away from respectively the other lower member 3 and other upper member 2, one half each of a continuous axial safety device 8 extends through the bores 2' and 3'. As a transmission element with an internal transmission profile, the axial safety device 8 surrounds the likewise profiled bar 6.

The two identically constructed plastic halves of axial safety device 8 comprise each a disk-shaped flange section 8', which lies with an annular inner front end flat against the corresponding outside of upper member 2 and lower member 3. The flange section 8' prevents the axial safety device 8 from displacing, and likewise avoids at the same time during the assembly and transportation of locking mechanism 1 that the upper member 2 and lower member 3 displace in axial direction. However, it does not prevent the upper member 2 from rotating relative to the lower member 3. For the transmission of axial forces occurring during the use of locking mechanism 1, sheet metal holders are provided, which are not shown in the drawing. The flange section 8' also acts as a seal against the entry of varnish, when the locking mechanism 1 is dip varnished.

Toward the inner front end of flange section 8' a slightly conical intermediate section 8" follows, which has smaller diameters than flange section 8', i.e., it is radially set back therefrom. The intermediate section 8" has likewise a smaller diameter than the bores 2' and 3' of upper member 2 and lower member 3, so that same are not seated on the intermediate section 8".

Toward the inner front end of intermediate section 8", the narrowed portion thereof is followed by a transmission section 8''', which is channeled both on its radially outer surface and on its radially inner surface. With its radially inner surface, the transmission section 8''' lies against bar 6. For a plain assembly, the channels of bar 6 and transmission section 8''' may be rotationally asymmetric.

In the axial direction, the transmission section 8''' comprises three finger-shaped projections 9 with three recesses 9' of the same shape, which are all provided on their edges with a saw-toothlike, coarse gear tooth system. During the assembly, the two halves of axial safety device 8 are inserted into each other with their transmission sections 8''' 60° out of phase, so that each finger-shaped projection 9 comes to lie in a recess 9' of the opposite half. The saw-toothlike teeth of the gear tooth system direct with their short flanks toward the respective flange section 8', the short flanks being made slightly hook-shaped. When the two halves of the axial safety device 8 are inserted into each other, the short flanks of the saw-toothlike teeth are resiliently pushed on top of one another due to the elasticity of the plastic material for purposes of engaging behind one another, so that the gear tooth system forms a clip connection.

On its inner side facing the lower member 3 of the mechanism, the upper member 2 has an annular cavity that extends around bore 2'. This annular cavity defines an assembly space 10 between the two parts 2 and 3 of the locking mechanism, which accommodates a plurality of parts described in the following. A peripheral boundary surface of assembly space 10 formed in the upper member 2 is indicated at 2".

A cam plate 11 in the form of a circular disk with two cams 180° out of phase on its outer circumference is located on the axial safety device 8 within the assembly space 10. The clipped-together transmission sections 8''' of the axial safety device 8 engage in nonrotating manner the bearing opening of cam plate 11, so that the cam plate 11 is rotatable by the bar 6 through the axial safety device 8, which acts as a transmission element. Via a step projecting in axial direction, the cam plate 11 is supported in bore 3' of lower member 3 of the locking mechanism.

In the same plane as cam plate 11, but at a greater radial distance from axial safety device 8, the assembly space 10 accommodates two flat toothed segments 13 serving as locking elements. The toothed segments 13 are arranged 180° out of phase (i.e. radially symmetric to each other), and can be moved in radial direction. On its radially outer end, each toothed segment 13 comprises on its edge a gear tooth system 13', and on its radially inner end it is provided on its edge with a tensioning cam profile, which cooperates with cam plate 11 that acts as a control disk. Between gear tooth system 13' and the tensioning cam profile, the edge surfaces of tooth segment 13 extend parallel to each other.

The lower member 3 of the mechanism comprises a guide element 15 which extends into the assembly space 10 for receiving toothed segments 13. The guide element 15 consists of two approximately C-shaped segments facing each other, which form in the outer region a channel for each toothed segment 13 and offer in the interior region, around axial safety device 8 with cam plate 11, a space for accommodating respectively one spiral spring 17. In this arrangement, the toothed segment 13 lies with its parallel edge surfaces against the side walls of the channel. Each of the two spiral springs 17 is supported at its inner end on a pin 17' within the inner region of guide element 15 and at its outer end on the circumference of cam plate 11. The spiral springs 17 rotate the cam plate 11 that acts as a control disk, so that its cams push toothed segments 13 radially outward by means of the tensioning cam profile.

A drive disk 19 is arranged inside the assembly space 10 in a shallow cavity of upper member 2 between the plane with the toothed segments 13 and the material portion of upper member 2 extending around bore 2'. In the illustrated embodiment, the drive disk 19 is mounted on the axial safety device 8, but it may also be supported on a projection of cam plate 11. The drive disk 19 rotates along with a rotation of bar 6. In its radially outer region, the disk-shaped drive disk 19 is provided with two diametrically opposite elongate slots 19', which extend on their radially outer side obliquely to the circumference of drive disk 19. From each toothed segment 13, a detent 21 projects on the side facing the upper member 2 of the locking mechanism. In the assembled state, this detent 21 comes to lie inside a slot 19'.

When the toothed segments 13 are pushed radially outward by the rotation of cam plate 11, the drive disk 19 rotates along therewith, so that the detents 21 inside the slots 19' are pushed radially outward. During a rotation in the opposite direction, the drive disk 19 pulls the toothed segments 13 radially inward via its slots 19' and via detents 21.

In the assembled state of the locking mechanism 1, the guide element 15 contacts with its outer surface in the circumferential direction the boundary surface 2" of assembly space 10, thereby supporting the upper member 2 of the locking mechanism directly on the guide element 15 and, thus, on the lower member 3 of the mechanism. The boundary surface 2" comprises a gear rim, which cooperates with the gear tooth system 13' of toothed segments 13, when the toothed segments 13 are pushed outward by cam plate 11. As soon as the gear rim of the upper member 2 and the gear tooth system 13' of toothed segment 13 engage each other, the locking mechanism will be engaged, i.e., the upper and lower members 2 and 3 can no longer be moved relative to each other. When the drive disk 19 retracts the toothed segments 13, it is possible to rotate upper member 2 and lower member 3 relative to each other. In this instance, the guide element 15 slides along the boundary surface 2" of assembly space 10.

In a modified embodiment, only a part of the boundary surface 2" is provided with a gear rim. In this instance, the toothed segments 13 can engage only in certain angular positions of upper member 2 and lower member 3, i.e., the locking mechanism 1 engages only in these angular positions.

What is claimed is:

1. A locking mechanism for a vehicle seat having a seat base and a seat back, the locking mechanism comprising:
    a bar that is capable of being rotated about a central axis;
    a lower member capable of being secured to the seat base;
    an upper member capable of being secured to the seat back, with the lower and upper members being mounted on said bar so as to be relatively rotatable about the central axis;
    a control element that is mounted so as to rotate with the bar;
    a locking element that is driven radially away from the bar by the control element in response to rotation of the control element, wherein the locking element engages both the lower member and the upper member so as to restrict rotation of the upper member relative to the lower member while the locking element is driven radially away from the bar by the control element; and a transmission element positioned between the control element and the bar, wherein the lower member comprises an outer side that faces away from the upper member, the upper member comprises an outer side that faces away from the lower member, and the transmission element comprises a first flange that engages the outer side of the upper member and a second flange that engages the outer side of the lower member.

2. A locking mechanism according to claim 1, wherein the transmission element engages the upper and lower members to hold the upper and lower members together, whereby the transmission element functions as an axial safety device.

3. A locking mechanism according to claim 2, wherein the transmission element extends continuously between the outer side of the lower member and the outer side of the upper member.

4. A locking mechanism according to claim 2, wherein:

the control element is in a first configuration while the locking element is driven radially away from the bar by the control element;

the locking mechanism further comprises a spring that biases the control element toward the first configuration;

the bar is capable of being rotated to a second configuration, wherein the control element rotates with the bar so that the locking element is capable of traveling radially toward the bar during the second configuration; and the locking mechanism further comprises a drive mechanism that rotates with the bar and drives the locking element radially toward the bar during the second configuration so that rotation of the upper member relative to the lower member is allowed during the second configuration.

5. A locking mechanism according to claim 2, wherein:

the transmission element defines a bore through which the bar extends;

the control element defines an opening through which the transmission element extends;

the lower member defines a bore through which the transmission element extends; and the upper member defines a bore through which the transmission element extends.

6. A locking mechanism according to claim 1, wherein the transmission element comprises a first half and a second half that is identical to and connected to the first half.

7. A locking mechanism according to claim 6, wherein:

the upper and lower members cooperate to define a space that is located between the upper and lower members; and the connection between the first and second halves of the transmission element is positioned in the space.

8. A locking mechanism according to claim 6, wherein each of the first and second halves of the transmission element comprises projections and defines recesses, and the projections of each of the first and second halves respectively protrude into the recesses of the other of the first and second halves to provide the connection between the first and second halves.

9. A locking mechanism according to claim 8, wherein the projections and the recesses of the first and second halves of the transmission element form a clip connection when the first and second halves are connected.

10. A locking mechanism according to claim 9, wherein each of the projections of the first and second halves of the transmission element comprises teeth.

11. A locking mechanism according to claim 9, wherein the transmission element is constructed of plastic.

12. An automobile seat, comprising:

a seat base;

a seat back; and a locking mechanism connected between the seat base and the seat back and operative to selectively allow and restrict pivoting of the seat back relative to the seat base, the locking mechanism comprising:

a bar that is capable of being rotated about a central axis, a lower member secured to the seat base, an upper member secured to the seat back, with the lower and upper members being mounted on said bar so as to be relatively rotatable about the central axis, a control element that is mounted so as to rotate with the bar, a locking element that is driven radially away from the bar by the control element in response to rotation of the control element, wherein the locking element engages both the lower member and the upper member so as to restrict rotation of the upper member relative to the lower member while the locking element is driven radially away from the bar by the control element, and a transmission element positioned between the control element and the bar, wherein the lower member comprises an outer side that faces away from the upper member, the upper member comprises an outer side that faces away from the lower member, and the transmission element comprises a first flange that engages the outer side of the upper member and a second flange that engages the outer side of the lower member to hold the upper and lower members together, whereby the transmission element functions as an axial safety device.

13. A locking mechanism according to claim 12, wherein:

the lower member comprises an outer side that faces away from the upper member;

the upper member comprises an outer side that faces away from the lower member; and the transmission element extends continuously between the outer side of the lower member and the outer side of the upper member.

14. A locking mechanism according to claim 12, wherein:

the control element is in a first configuration while the locking element is driven radially away from the bar by the control element;

the locking mechanism further comprises a spring that biases the control element toward the first configuration;

the bar is capable of being rotated to a second configuration, wherein the control element rotates with the bar so that the locking element is capable of traveling radially toward the bar during the second configuration; and the locking mechanism further comprises a drive mechanism that rotates with the bar and drives the locking element radially toward the bar during the second configuration so that rotation of the upper member relative to the lower member is allowed during the second configuration.

15. A locking mechanism according to claim 12, wherein:

the transmission element defines a bore through which the bar extends;

the control element defines an opening through which the transmission element extends;

the lower member defines a bore through which the transmission element extends; and the upper member defines a bore through which the transmission element extends.

16. A locking mechanism according to claim 12, wherein the transmission element comprises a first half and a second half that is identical to and connected to the first half.

17. A locking mechanism according to claim 16, wherein the upper and lower members cooperate to define a space that is located between the upper and lower members; and the connection between the first and second halves of the transmission element is positioned in the space.

18. A locking mechanism for a vehicle seat having a seat base and a seat back, the locking mechanism comprising:

a bar that is capable of being rotated about a central axis;

a lower member capable of being secured to the seat base;

an upper member capable of being secured to the seat back, with the lower and upper members being mounted on said bar so as to be relatively rotatable about the central axis, the lower member having an outer side that faces away from the upper member, and the upper member having an outer side that faces away from the lower member;

a control element that is mounted so as to rotate with the bar;

a locking element that is driven radially away from the bar by the control element in response to rotation of the control element, wherein the locking element engages both the lower member and the upper member so as to restrict rotation of the upper member relative to the lower member while the locking element is driven radially away from the bar by the control element; and a transmission element positioned radially between the control element and the bar for causing the control element to rotate with the bar, wherein the transmission element is formed separately from the bar and the control element, and the transmission element extends between the outer side of the upper member and the outer side of the lower member.

19. A locking mechanism according to claim 18, wherein the transmission element engages the upper and lower members to restrict relative movement between the upper and lower members in the direction of the central axis.

20. A locking mechanism according to claim 18, wherein each of the transmission element, the control element and the bar extend in a common plane that is perpendicular to the central axis.

21. A locking mechanism according to claim 18, wherein the transmission element extends from the outer side of the upper member to the outer side of the lower member.

22. A locking mechanism according to claim 18, wherein the transmission element comprises a first half and a second half that is connected to the first half, each of the first and second halves of the transmission element comprises projections and defines recesses, and the projections of each of the first and second halves respectively protrude into the recesses of the other of the first and second halves to provide the connection between the first and second halves.

23. A locking mechanism according to claim 18, wherein the bar includes a spline engaging a corresponding internal profile of the transmission element.

* * * * *